(12) United States Patent
Ono et al.

(10) Patent No.: US 6,996,046 B2
(45) Date of Patent: Feb. 7, 2006

(54) INFORMATION RECORDING APPARATUS AND METHOD

(75) Inventors: Hiroaki Ono, Fujisawa (JP); Hideo Nishijima, Hitachinaka (JP); Tatsuya Ishitobi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 453 days.

(21) Appl. No.: 10/112,791

(22) Filed: Mar. 28, 2002

(65) Prior Publication Data

US 2003/0112728 A1 Jun. 19, 2003

(30) Foreign Application Priority Data

Dec. 14, 2001 (JP) .......................... 2001-380839

(51) Int. Cl.
*G11B 5/09* (2006.01)

(52) U.S. Cl. .................. 369/53.37; 369/53.12; 369/53.31

(58) Field of Classification Search .............. 369/53.12, 369/53.2, 53.37, 53.13, 53.14, 53.18, 53.31, 369/53.35, 53.36, 47.44, 47.32, 47.33, 47.34, 369/44.32; 386/124, 125, 126
See application file for complete search history.

(56) References Cited

U.S. PATENT DOCUMENTS 5,771,214 A * 6/1998 Saga .................. 369/44.29
6,587,416 B1 * 7/2003 Tsukihashi ............... 369/47.28

FOREIGN PATENT DOCUMENTS

| JP | 6-44627 | 2/1994 |
| JP | 2001-176211 | 6/2001 |

\* cited by examiner

*Primary Examiner*—Thang V. Tran
(74) *Attorney, Agent, or Firm*—Townsend and Townsend and Crew LLP

(57) ABSTRACT

An information recording technique which, even when an interruption of recording operation takes place for some reasons, can make the most of the features of a recording medium and can record data on the medium with a good reliability. This can be realized by changing abnormality judging conditions according to the type of the recording medium and changing record resuming conditions after the interruption of the recording operation.

14 Claims, 4 Drawing Sheets

FIG.4
(1); RECORD RESUMING OPERATION AT THE TIME OF
INTERRUPTING RECORDING OPERATION OF REWRITABLE OPTICAL DISK
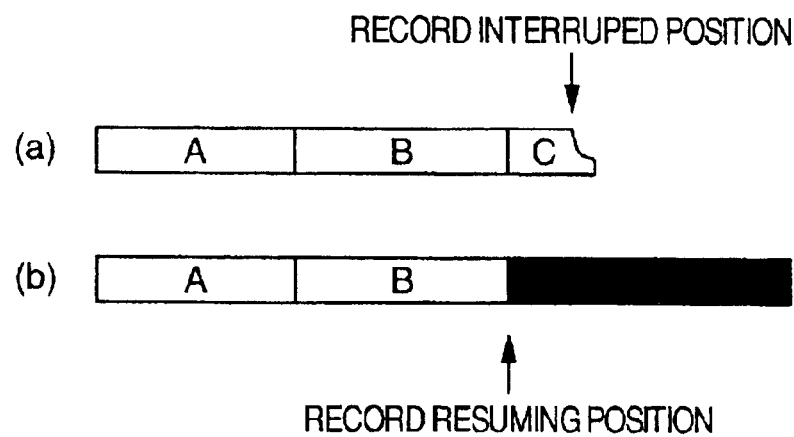
(2); RECORD RESUMING OPERATION AT THE TIME OF
INTERRUPTING RECORDING OPERATION OF UNREWRITABLE OPTICAL DISK
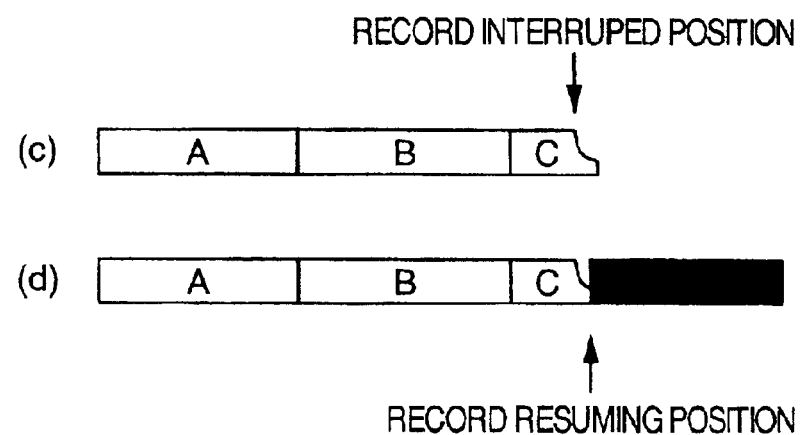

US 6,996,046 B2

INFORMATION RECORDING APPARATUS AND METHOD

BACKGROUND OF THE INVENTION

The present invention relates to information recording technique for recording information on a plurality of sorts of recording media and more particular, to an information recording technique which can perform record interrupting or resuming operation suitable depending on the type of the recording medium when information is recorded on the recording medium.

In an information recording apparatus for recording information on a rewritable recording medium such as a CD-RW (rewrite), DVD-RAM (random access memory) or DVD-RW; there is a problem that, due to vibration/shock, dust on a recording medium, a defect on the recording medium, electric noise or abnormality such as abnormal control, recording information cannot normally reach the recording medium from an optical recording head and thus cannot be normally recorded on the recording medium with a result of a recording error. In order to solve the problem, a so-called retry operation that an unrecordable location is scanned once again for recording operation has conventionally been carried out. JP-A-6-44627 discloses a technique wherein, when a vibration sensor for previously detecting vibration detects vibration during recording operation, the recording is interrupted and at the time of resuming the recording operation, information is again recorded from the head of a record unit.

Meanwhile, among recording media, there is an information recording apparatus for recording information on a unrewritable recording medium such as a DVD-R (recordable) or a CD-R. In the conventional information recording apparatus, however, the record start position is fixed to the start point of a basic record unit such as a sector or block prescribed by the recording medium Standard, so that, when recording operation is stopped by buffer under-run, the recording is stopped at the end point of the basic record unit and, as soon as the recording becomes possible, the recording is assumed from the start point of the basic record unit where the recording was stopped. When an abnormality has to stop the recording operation at halfway of the basic record unit, however, it is impossible to perform its re-recording operation by retry operation as in the rewritable recording medium, and such an operation as to discard the recording medium in use and exchange it with a new recording medium must be carried out. Also disclosed in JP-A-2001-176211 is a technique in an information recording apparatus for recording information on an unrewritable recording medium, wherein, when recording operation is stopped and then assumed thereafter, the information can be seamlessly continuously recorded directly after the record stop position. In these years, there is suggested such a technique that an identical information recording apparatus can record information in various types of recording media. This is developed from users' needs who want, for example, to use a rewritable recording medium for a fine file or a file which requires rewriting operation many times, and to use an unrewritable recording medium for a file of information which requires no rewriting operation and is used only for data backup. However, the re-recording conditions are not changed differently for the rewritable recording media and the unrewritable recording media, the apparatus perform retry operation for the rewritable recording medium and the unrewritable recording medium must be exchanged a new one as in the prior art. In addition, such an information recording apparatus cannot take a precaution measure to previously prevent a recording error caused by an abnormality.

SUMMARY OF THE INVENTION

The technique for recording and reproducing information in and from various recording media beforementioned as conventional information recording apparatus is a valid means for an application such as a data backup to record recording information on the recording medium with a higher reliability. However, when it is desired to record, e.g., a movie program or the like on a real time basis, the recording information itself is an original source. Thus, even when an abnormality causes the recording operation to have to be stopped, it cannot be allowed to once erase already-recorded information and then restart the recording operation from its beginning or to discard the recording medium in used and to exchange it with a new recording medium. Therefore, it is required to take a precaution measure to previously prevent a recording error caused by an abnormality.

In view of the above respects, it is an object of the present invention to provide an information recording technique for recording information on a plurality of sorts of recording media, which can take a precaution or record resuming measure suitable depending on the type of the recording medium.

In order to attain the above object, the present invention is suggested. The present invention is an information recording technique for recording information on a plurality of types of recording media, which, changes abnormality judging condition or record resuming condition to judge an abnormality depending on the type of the recording medium, interrupts the recording operation on the basis of the abnormality judging condition during the recording operation of the information, and resumes the recording operation on the basis of the record resuming condition when the recording operation is restarted.

Other objects, features and advantages of the invention will become apparent from the following description of the embodiments of the invention taken in conjunction with the accompanying drawings.

BRIEF DESCRIPTION OF THE DRAWINGS

FIG. 4 shows, in a model form, diagrams for explaining the conditions of recorded information on an optical disk in the embodiment of the present invention.

DETAILED DESCRIPTION OF THE EMBODIMENTS

An embodiment of the present invention will be explained with reference to the accompanying drawings. In this embodiment, explanation will be made on the assumption that a recording medium is an optical disk and information to be recorded is audio visual (A/V) information such as visual or audio information.

Figure 1:
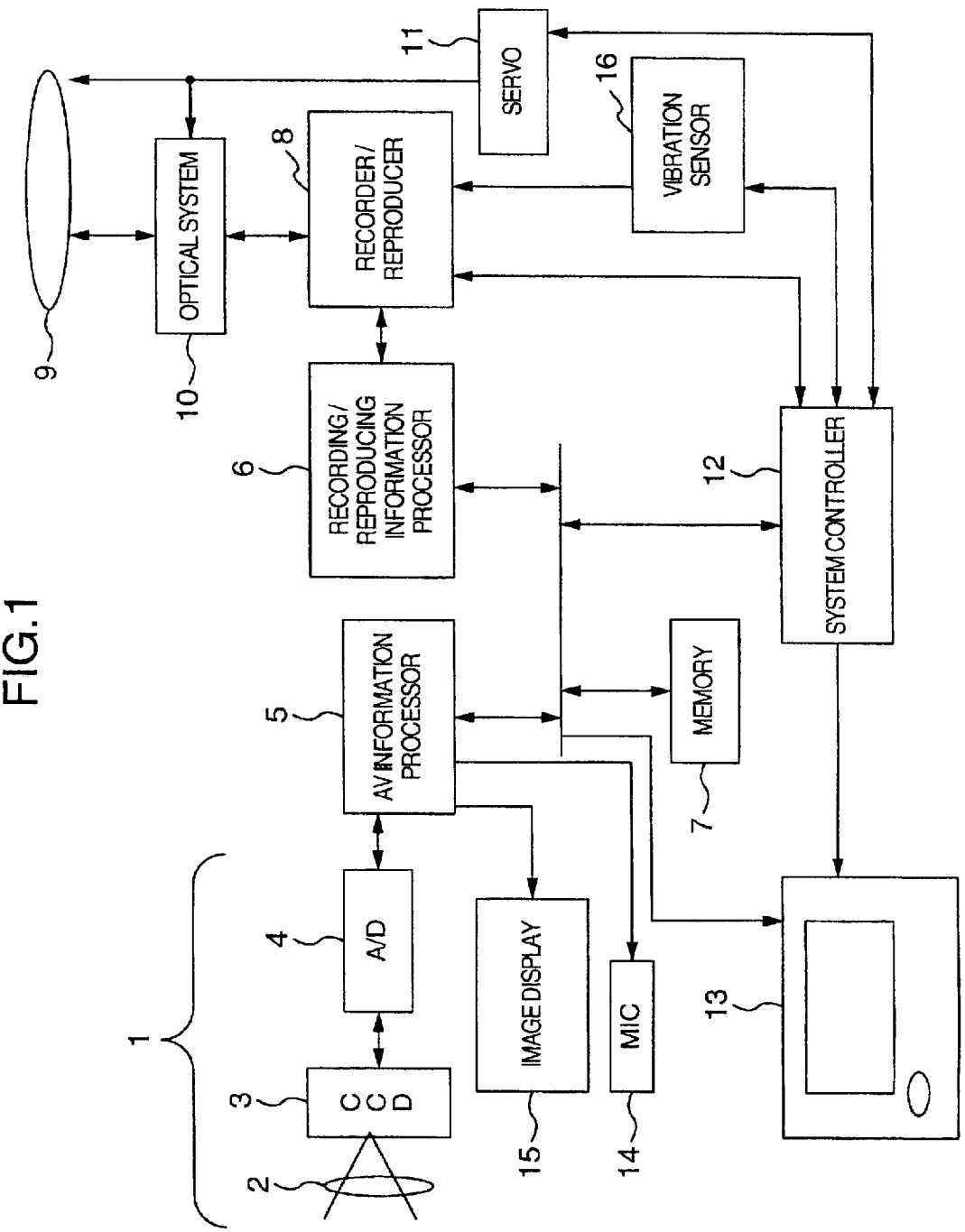
FIG. 1 is a block diagram of an optical disk apparatus in accordance with an embodiment of the present invention.

FIG. 1 shows a block diagram of a schematic arrangement of an information recording apparatus in accordance with an embodiment of the present invention. In FIG. 1, a visual pickup section 1 includes a pickup optical system 2, a charge coupled device (CCD) 3 and an analog/digital (A/D) converter 4. In the visual pickup section 1, an object to be photographed is visual by the pickup optical system 2 on the CCD 3, visual information is obtained by the CCD 3, digitized by the A/D converter 4, and then output. An AV information processor 5 has a circuit which subjects visual information received from the visual pickup section 1 and audio information received from a microphone 14 to information processing operation such as information compression. In a reproduction mode, the AV information processor 5 is arranged so as to convert visual information received from a recording/reproducing information processor 6 to visual information for display output and further to convert audio information received from the recording/reproducing information processor 6 to audio information for audio output. In the case of a video camera, such visual and audio information are continuously processed by the AV information processor 5, and a visual quality and voice quality are determined by the information compression ratio of the AV information processor 5. As the information compression ratio is increased, the transmission rate of data sent from the AV information processor 5 to the recording/reproducing information processor 6 becomes higher.

The recording/reproducing information processor 6 performs encoding/decoding, modulating/demodulating, error correction code (ECC) adding/error correcting operations in order to receive information from the AV information processor 5 or to convert recorded information reproduced from an optical disk 9 into original AV information conforming to a recording format. The transmission rate of recording or reproducing operation to or from the optical disk 9 is determined by the processing ability of the recording/reproducing information processor 6 and by the processing ability of a recorder/reproducer 8. A memory 7 is provided to temporarily store therein the AV information received from the AV information processor 5 to accommodate a difference between the transmission rate of the AV information of the AV information processor 5 and the transmission rate of the AV information to be recorded or reproduced onto or from the optical disk 9.

An optical system 10 includes a laser source (laser diode), an optical detector and an optical head. A servo 11 performs servo control necessary for optical disk recording, e.g., focus or tracking control to control an actuator (not shown) possessed by the optical system 10, rotation control of the optical disk to control an SNP motor (not shown), seek control to control an address position, etc.

An image display unit 15 is a means such as an LCD for displaying an image. The recorder/reproducer 8 has a circuit which records and reproduces information on and from the optical disk 9 through the optical system. In the reproduction mode, the AV information on the optical disk 9 reproduced by the optical system 10 under control of the recorder/reproducer 8 is decoded by the recording/reproducing information processor 6, once stored in the memory 7, and then input to the image display unit 15 and the microphone 14 having a loudspeaker function via the AV information processor 5.

A vibration sensor 16, which is a means for detecting external vibration, converts an analog signal generated by the vibration to a digital signal and outputs its detection result to the recorder/reproducer 8. In this connection, a phenomenon other than the vibration is considered as an abnormality, but explanation will be made in connection with the abnormality is vibration in the present embodiment. A system controller 12 includes a control microcomputer for performing general control over the entire apparatus to control the aforementioned constituent elements or the entire apparatus. Further, the above-mentioned information recording apparatus is connected to an external television 13 to display the information.

Figure 2:
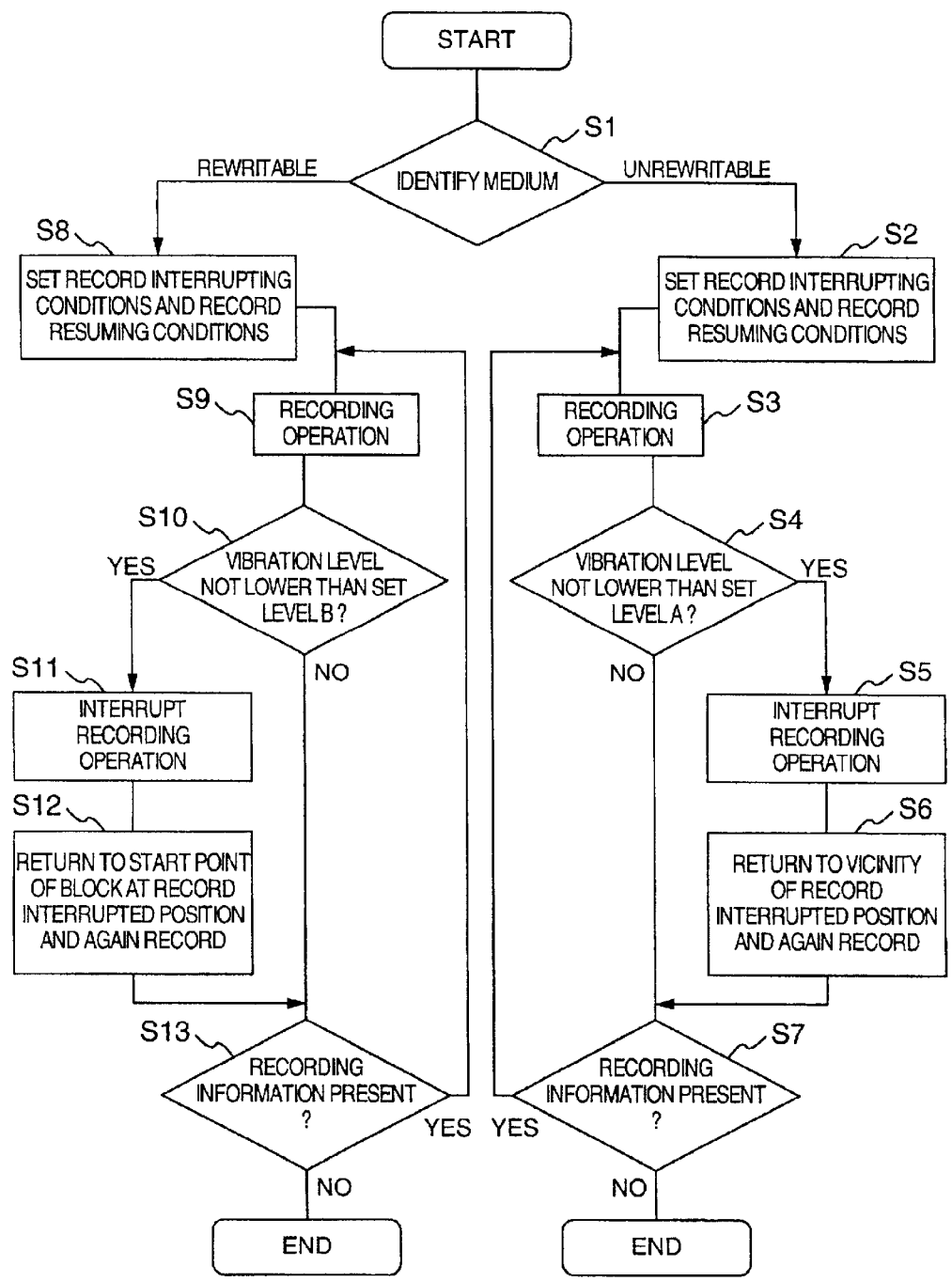
FIG. 2 is a flowchart for explaining the operation of the embodiment of the present invention.
Figure 3:
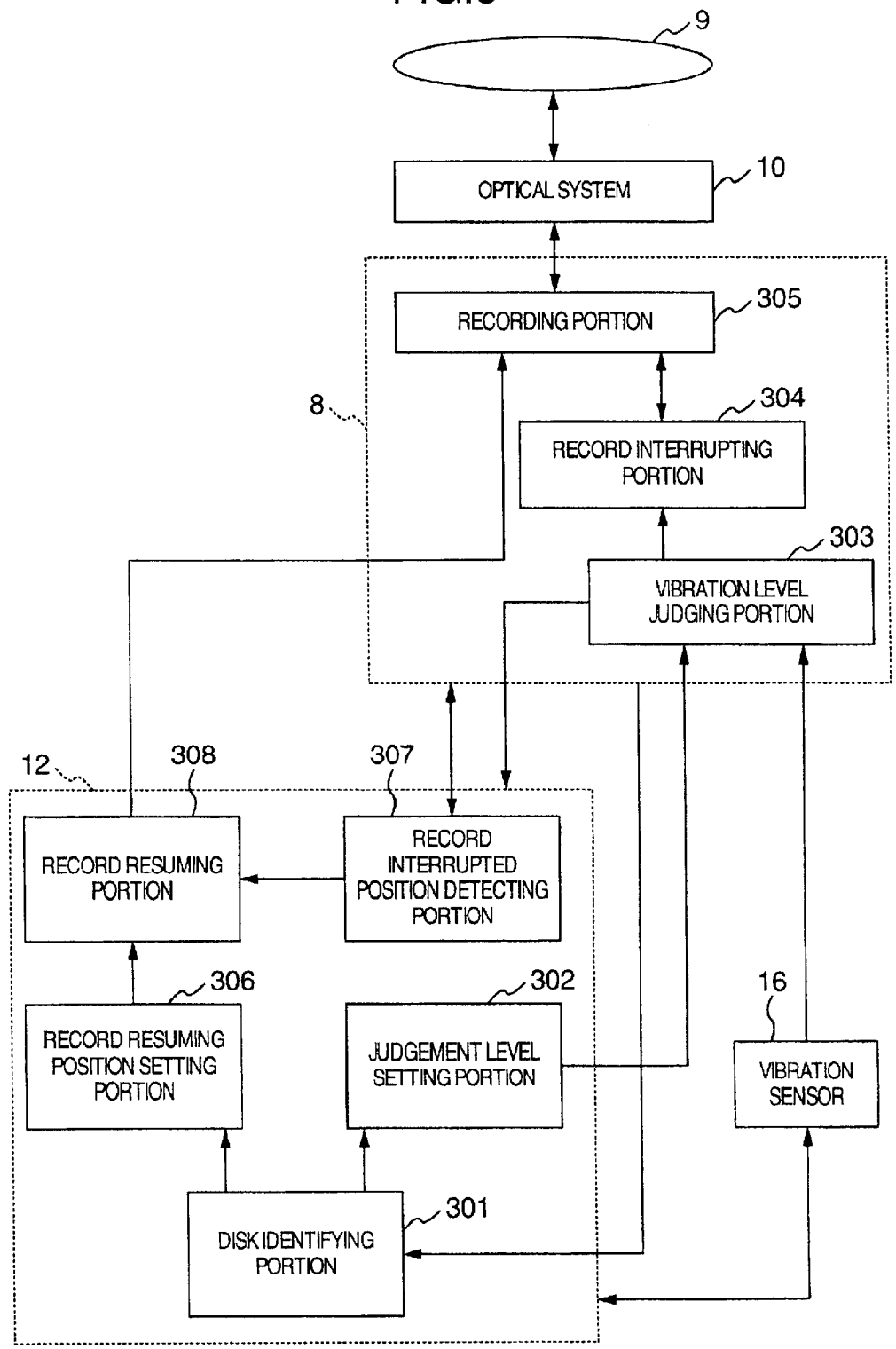
FIG. 3 is a block diagram of the present invention.

Explanation will next be made as to the operation of the present embodiment when put in such a state as not to normally record information on the optical disk, by referring to the flowchart of FIG. 2 and the block diagram of FIG. 3. FIG. 3 shows a block diagram of only processing sections associated with the present embodiment for explaining the embodiment, wherein parts similar to those in FIG. 1 are denoted by the same reference numerals.

In a step S1, an optical disk judging portion 301 reads out a reflectivity of the optical disk 9 through the optical system 10 under control of the recorder/reproducer 8 and judges whether the optical disk 9 is a rewritable or unrewritable optical disk. In this connection, identification of the optical disk may be carried out, for example, by any method including a method for the user to enter the type of the disk. Alternatively the identification of the optical disk may be carried out directly after the power is turned ON, or, when the optical disk is exchange during turning ON of the power, the disk identification may be carried out during the turning ON of the power. In this connection, it is preferable to carry out the disk identification before the apparatus starts its recording operation.

In a step S2, a judged level setter 302 receives information indicating that the optical disk 9 is a unrewritable disk, from the optical disk judging portion 301, and sets a vibration level (assumed to be level A) to interrupt the recording operation of a vibration level judging portion 303 on the basis of the received information. Further, a record resuming-position setting portion 306 receives information indicating that the optical disk 9 is a unrewritable disk, from the optical disk judging portion 301, and sets record resuming conditions of a record resuming portion 308 into record resuming conditions in the case of the unrewritable disk on the basis of the received information. In this connection, it is the conditions of record resuming position that are mainly set, which will be explained later.

In a step S3, the optical system 10 starts its recording operation of the AV information on the optical disk 9 under control of the recorder/reproducer 8. When the vibration level judging portion 303 judges in a step S4 that a vibration level outputted from the vibration sensor 16 is A or higher, the vibration level judging portion 303, in a step S5, outputs information indicating that the vibration level is A or higher to a record interrupting portion 304. The record interrupting portion 304 in turn, on the basis of the received information, outputs information to a recording portion 305 to interrupt the recording operation, whereby the recording portion 305 interrupts the AV-information recording operation of the optical system 10. The recording operation is interrupted not in at the end point of the basic record unit but even at halfway of the basic record unit. At this time, a record interrupt position detecting portion 307 detects a position on the optical disk 9 where the recording operation was interrupted and holds the detected position.

In a step S6, when the vibration level outputted from the vibration sensor 16 becomes A or lower, the vibration level judging portion 303 outputs information indicating that the vibration level is A or lower to the system controller 12, whereby the record resuming portion 308 resumes the recording operation of the AV information left as not recorded by the recording portion 305. At this time, since the optical disk 9 is of a unrewritable type, the resuming operation of the recording operation is carried out from the vicinity of the record interrupted position. In order to detect the record resuming position, the record resuming portion 308 acquires information indicative of the record interrupted position from the record interrupt position detecting portion 307. In a step S7, when there is still recording information, the apparatus repeats the operations of the steps S3 to S7 to continue the recording operation of the AV information.

Next, when the optical disk 9 is judged to be of a rewritable type in the step S1, the judged level setter 302, in a step S8, receives information indicative of the rewritable optical disk 9 from the optical disk judging portion 301, and on the basis of the received information, sets the vibration level at B to interrupt the recording operation of the vibration level judging portion 303. The record resuming-position setting portion 306 receives information indicative of the rewritable optical disk 9 from the optical disk judging portion 301 and, on the basis of the received information, sets the record resuming conditions of the record resuming portion 308 to record resuming conditions in the case of rewritable optical disk. In this case, it is conditions of record resuming position that are mainly set, which will be explained later.

In a step S9, the optical system 10 starts its recording operation of the AV information on the optical disk 9 under control of the recorder/reproducer 8. When the vibration level judging portion 303 judges in a step S10 that the output vibration level of the vibration sensor 16 is B or higher, the vibration level judging portion 303 outputs information indicative of the vibration level of B or higher to the record interrupting portion 304. On the basis of the received information, the recording portion 305 interrupts the recording operation of the AV information by the optical system 10. The recording operation is interrupted not at the end point of the basic record unit but even at halfway of the basic record unit. At this time, the record interrupt position detecting portion 307 detects a position on the optical disk 9 where the recording operation was interrupted, and holds the position. In a step S12, when the output vibration level of the vibration sensor 16 becomes B or lower, the vibration level judging portion 303 outputs information indicative of the vibration level of B or lower to the system controller 12, whereby the record resuming portion 308 resumes the recording operation of the AV information still remaining as not recorded by the recording portion 305. At this time, since the optical disk 9 is of the rewritable type, the resuming operation of the recording operation starts with the start point of the basic record unit which indicating the record interrupted position. In order to detect the record resuming position, the record resuming portion 308 acquires information indicative of the record interrupted position from the record interrupt position detecting portion 307.

When there still exists recording information in a step S13, the apparatus repeats the operations of the steps S9 to S13 to continue the recording operation of the AV information. Although the present embodiment has been arranged and illustrated so that the recorder/reproducer 8 has the vibration level judging portion 303 and record interrupting portion 304, such an arrangement that the system controller 12 has the vibration level judging portion 303 and record interrupting portion 304 may be allowed.

In the present invention, next, the vibration level A is set to have a value different from the vibration level B, vibration detection suitable depending on the type of the optical disk can be realized. With respect to the values of the vibration levels A and B, there are, e.g., two ways of setting such values. The first way is to set the vibration level A to be higher than the vibration level B. In the case of recording information on the rewritable optical disk, if the memory capacity for temporary saving of the AV information is sufficient, then retry operation can be frequently carried out. Thus, even when the vibration level B of the vibration level judging portion is set to be low, deterioration of the quality of recording operation can be prevented by the frequent retry operation. In the case of the unrewritable optical disk, on the other hand, interruption itself of the recording operation leads to deterioration of the recording quality, the vibration level A is required to be set higher than the vibration level B to avoid the interruption of the recording operation as reliably as possible. The other setting way is to set the vibration level A to be lower than the vibration level B. For the rewritable optical disk, so-called retry operation of correctly re-record the location of the information having a recording error is possible. Accordingly, when compared with an inherently-unrewritable optical disk, the recording quality is less deteriorated by the interruption of the recording operation. Thus the information compression ratio of the AV information processor 5 can be suppressed low and the quality of the AV information can be made high. For this reason, it is demanded that the amount of AV information transmitted per unit time be made more and the information transmission rate of the AV information processor 5 be correspondingly increased. If this can cause increase of the processing speeds of the recorder/reproducer 8 or recording/reproducing information processor 6 and causes increase of the recording rate of information to the optical disk 9, then it is ok. However, when the recording rate to the optical disk 9 cannot be increased, a difference between the transmission rate of the AV information of the AV information processor 5 and the transmission rate of the AV information to be recorded or reproduced on or from the optical disk 9 becomes small, which sometimes results in that a sufficient capacity cannot be secured in the memory 7. In such a case, it is considered to set the vibration level of the vibration level setting portion to be higher to record information without repeating the retry operation many times. In the case of the unrewritable optical disk, on the other hand, since its recording operation is allowed only once, such retry operation cannot be allowed and thus careful attention is required to be paid to the recording operation. Therefore, the information compression ratio of the AV information processor 5 is set high, with the result that the information transmission rate of the AV information processor 5 is decreased. In this case, a difference between the transmission rate of the AV information of the AV information processor 5 and the transmission rate of the AV information to be recorded or reproduced to or from the optical disk 9 becomes large and thus a sufficient capacity can be secured in the memory 7. Therefore it is also considered to set the vibration level A to be lower than the vibration level B. Further, the values of the vibration levels A and B may be made different from the viewpoint of matters other than the above. The value of the vibration level A may be set, in some cases, to be the same as the value of the vibration level B. The present embodiment has been explained in connection with the case where the type of the optical disk is identified, the vibration level A or vibration level B is set on the basis of the identified result, and the record resuming conditions are set. However, the embodiment may be arranged so that the vibration level A (or vibration level B) is previously set so that, when the current disk is exchanged with a rewritable disk (or unrewritable disk), the vibration level A is switched to the vibration level B (or the vibration level B is switched to the vibration level A).

Explanation will then be made as to the record resuming operation after the recording operation was interrupted on the way in various types of optical disks, with reference to FIG. 4. FIG. 4, (1) shows diagrams for explaining the record resuming operation on the way in a rewritable optical disk. In FIG. 4, (a), a basic record unit is, for example, a block unit added by an ECC determined by the optical disk Standard, that is, address addition basically is carried out on a reference block basis. FIG. 4 shows a state when information on addresses A and B are recorded and thereafter the recording operation is interrupted by external vibration in the course of information of address C. In FIG. 4, (b), after the recording operation is interrupted, the record resuming operation is returned to the head of the block of the address C where the recording operation was interrupted, the information of the address C is overwritten and recorded from the head, and subsequently information of addresses D and thereafter are sequentially recorded. FIG. 4, (2) shows diagrams for explaining the record resuming operation after the recording operation was interrupted on the way in an unrewritable optical disk. In FIG. 4, (c), a basic record unit is a block unit, for example, added by the ECC determined on the optical disk Standard, that is, address addition basically is carried out on a reference block basis. FIG. 4 shows a state when the information of the addresses A and B were recorded and thereafter the recording operation was interrupted due to abnormality detection in the course of the information of the address C. In FIG. 4, (d), after the recording operation was interrupted, the record resuming operation is carried out from the location of the block at the address C where the recording operation was stopped, remaining information not recorded yet is continuously recorded, and thereafter information of addresses D and thereafter are sequentially recorded. With such an arrangement as mentioned above, the apparatus can take a suitable precaution measure according to the type of the optical disk.

Although the explanation has been made in connection with the case where the recording medium is an optical disk in the present embodiment, the present invention can be applied to any recording medium, so long as the medium requires a vibration measure. Further, the present embodiment has been explained in the connection with the case where information to be recorded is AV information, but the present invention can be applied even to information other than the AV information. Furthermore, though the explanation has been made in the connection with the apparatus including the pickup section in the present embodiment, the present invention can be applied even to the installation apparatus not including the pickup device.

As has been explained in the foregoing, the information recording technique of the present invention for recording information on a plurality of recording media can take a suitable precaution measure or record resuming measure according to the type of the recording medium.

It should be further understood by those skilled in the art that the foregoing description has been made on embodiments of the invention and that various changes and modifications may be made in the invention without departing from the spirit of the invention and the scope of the appended claims.

What is claimed is:

1. An information recording apparatus for recording information on a plurality of types of optical disks, comprising:
    means for changing abnormality judging conditions according to the type of the optical disk to interrupt recording operation; and
    portion for interrupting the recording operation during recording operation of the information on the basis of said abnormality judging conditions,
    wherein said abnormality is vibration or abnormal control, and said optical disks include rewritable and unrewritable optical disks.

2. An information recording apparatus as set forth in claim 1, further comprising means for changing record resuming conditions to said optical disk according to the type of said optical disk when an abnormality causes interruption of the recording operation.

3. An information recording apparatus for recording information on a plurality of types of optical disks, comprising:
    means for changing record resuming conditions to the optical disk according to the type of the optical disk when an abnormality causes interruption of recording operation; and
    means for resuming the recording operation on the basis of said record resuming conditions when the recording operation is resumed after the interruption of the recording operation caused by said abnormality.

4. An information recording apparatus as set forth in claim 3, wherein said abnormality is vibration or abnormal control, and said optical disks include rewritable and unrewritable optical disks for recording said information on a predetermined record unit basis, said record resuming conditions are record resuming position conditions, a record resuming position when said optical disk is the rewritable optical disk is a start point of a record unit where the interruption of the recording operation took place, and a record resuming position when said optical disk is the unrewritable optical disk is a position in the vicinity of a location where the interruption of the recording operation took place.

5. An information recording apparatus for recording information on a plurality of types of optical disks, comprising:
    recording/reproducing means for recording information on the optical disk or reproducing information from the optical disk;
    optical disk identifying means for identifying the type of the optical disk;
    abnormality detecting means for detecting an abnormality, wherein said abnormality is vibration or abnormal control;
    abnormal level judging means for judging whether or not an abnormality level detected by said abnormality detecting means is not lower than a predetermined level;
    judgement level setting means for setting an abnormality judgement level of said abnormal level judging means on the basis of an identified result of said optical disk identifying means;
    record interrupting means for interrupting recording operation of said recording/reproducing means when said abnormal level judging means determines that said abnormality level is not lower than said abnormality judgement level;
    record interrupted-position detecting means for detecting an interrupted position of recording operation to the optical disk;
    record resuming-position setting means for setting record resuming position conditions on the basis of an identified result of said optical disk identifying means; and
    record resuming means for resuming the recording operation from a position set by said record resuming-position setting means.

6. An information recording apparatus for recording information on a plurality of types of optical disks, comprising:
    recording/reproducing means for recording information on the optical disk and reproducing information from the optical disk;

optical disk identifying means for identifying the type of the optical disk; record interrupted-position detecting means for detecting a position of recording operation interrupted by an abnormality;

record resuming-position setting means for setting record resuming position conditions on the basis of an identified result of said optical disk identifying means; and record resuming means for resuming the recording operation from a position set by said record resuming-position setting means.

7. An information recording apparatus for recording AV information on a plurality of types of optical disks, comprising:

a system controller for controlling said information recording apparatus;

a recorder/reproducer for recording the AV information on the optical disk and reproducing AV information from the optical disk; and an abnormality detector for detecting an abnormality, wherein said system controller sets an abnormality judgement level to interrupt the recording operation according to the type of the optical disk, said recorder/reproducer records the AV information on the optical disk, and, when an abnormality level detected y said abnormality detector during the recording operation of the AV information is not lower than said abnormality judgement level, said recorder/reproducer interrupts the recording operation, wherein said abnormality is vibration or abnormal control, and said system controller sets record resuming position conditions according to the type of the optical disk, detects a record interrupted position when the recording operation of the AV information of said recorder/reproducer was interrupted, and resumes the recording operation of the AV information of said recorder/reproducer from a position based on said record resuming position conditions in a record unit including said record interrupted position.

8. An information recording apparatus for recording AV information on a plurality of types of optical disks on a predetermined record unit basis, comprising:

a system controller configured to control said information recording apparatus; and a recorder/reproducer configured to record the AV information on the optical disk or to reproduce the AV information from the optical disk, and wherein said system controller sets record resuming position conditions according to the type of the optical disk, detects a record interrupted position when the recording operation of the AV information of said recorder/reproducer was interrupted, and resumes the recording operation of the AV information of said recorder/reproducer from a position based on said record resuming position conditions in a record unit including said record interrupted position.

9. An information recording method for recording information on a plurality of types of optical disks, comprising:

changing abnormality judging conditions according to the type of the optical disk to interrupt recording operation; and interrupting the recording operation during the recording operation of the information on the basis of said abnormality judging conditions, wherein record resuming conditions to the optical disk according to the type of the optical disk is changed when an abnormality causes interruption of the recording operation.

10. An information recording method as set forth in claim 9, wherein said abnormality is vibration or abnormal control.

11. An information recording method for recording information on a plurality of types of optical disks, comprising:

changing record resuming conditions to the optical disk according to the type of the optical disk when an abnormality causes interruption of the recording operation; and resuming the recording operation on the basis of said record resuming conditions when the recording operation is resumed after the interruption of the recording operation caused by said abnormality.

12. An information recording method for recording information on a plurality of types of optical disks, comprising:

identifying the type of the optical disk;

setting an abnormality judgement level for judgement of whether or not an abnormality level is not lower than a predetermined level on the basis of a disk type identified result, wherein said abnormality is vibration or abnormal control;

interrupting the recording operation to the optical disk when it is determined that said abnormality level is not lower than said abnormality judgement level;

detecting an interrupted position information indicative of an interrupted position of recording operation; and resuming the recording operation on the basis of said interrupted position information when recording operation is resumed.

13. An information recording apparatus for recording information on a plurality of types of optical disks, comprising:

means for changing abnormality judging conditions according to the type of the optical disk to interrupt recording operation;

portion for interrupting the recording operation during recording operation of the information on the basis of said abnormality judging conditions; and means for changing record resuming conditions to said optical disk according to the type of said optical disk when an abnormality causes interruption of the recording operation.

14. An information recording apparatus as set forth in claim 13, wherein said abnormality is vibration or abnormal control.

* * * * *